Sept. 23, 1958      H. F. HOBBS      2,852,954

POWER TRANSMISSION GEARS

Filed March 7, 1955      4 Sheets-Sheet 1

INVENTOR
HOWARD FREDERICK HOBBS
By Young, Emery & Thompson
ATTORNEYS

Sept. 23, 1958

H. F. HOBBS 2,852,954

POWER TRANSMISSION GEARS

Filed March 7, 1955

INVENTOR
HOWARD FREDERICK HOBBS
By Young Emery & Thompson
ATTORNEYS

Sept. 23, 1958 H. F. HOBBS 2,852,954
POWER TRANSMISSION GEARS

Filed March 7, 1955 4 Sheets-Sheet 3

INVENTOR
HOWARD FREDERICK HOBBS
By Young, Emery & Thompson
ATTORNEYS

Sept. 23, 1958  H. F. HOBBS  2,852,954
POWER TRANSMISSION GEARS
Filed March 7, 1955  4 Sheets-Sheet 4

INVENTOR
HOWARD FREDERICK HOBBS
By Young, Emery & Thompson
ATTORNEYS

United States Patent Office 2,852,954
Patented Sept. 23, 1958

2,852,954

POWER TRANSMISSION GEARS

Howard F. Hobbs, Leamington Spa, England, assignor to Hobbs Transmission Limited, Leamington Spa, England Application March 7, 1955, Serial No. 492,473

Claims priority, application Great Britain March 5, 1954

6 Claims. (Cl. 74—394)

This invention relates to power transmission gears and its main object is to provide an improved gear whereby the load can be driven at cyclically varying speeds. The invention is particularly but not solely intended for driving the container of a washing machine whereby the container can be rapidly but smoothly accelerated in one direction, then brought to rest and accelerated in the opposite direction, the container being preferably but not necessarily rotated through at least three revolutions at each reversal.

According to the invention the gear comprises an input or driven member, an output member, a reaction member, a first gearing between the input member and output member, a second gearing between the input member and the reaction member, said first and second gearing being drivable without rotating the output member, and control means to effect cyclic variation of circulation of power between the two gearings, thereby driving the output member at variable speeds e. g. alternately in opposite directions.

The gearings are preferably of the planetary type and of equal ratio, one of said gearings comprising planet pinions carried by the input member and meshing with a sunwheel on the output member, and the other gearing comprising other planet pinions carried by the input member and meshing with a sunwheel on the reaction member.

The control means for effecting cyclic variation of power preferably comprise friction means coupling said gearings.

The invention will now be described by way of example with reference to the accompanying drawings wherein.

Figure 1:
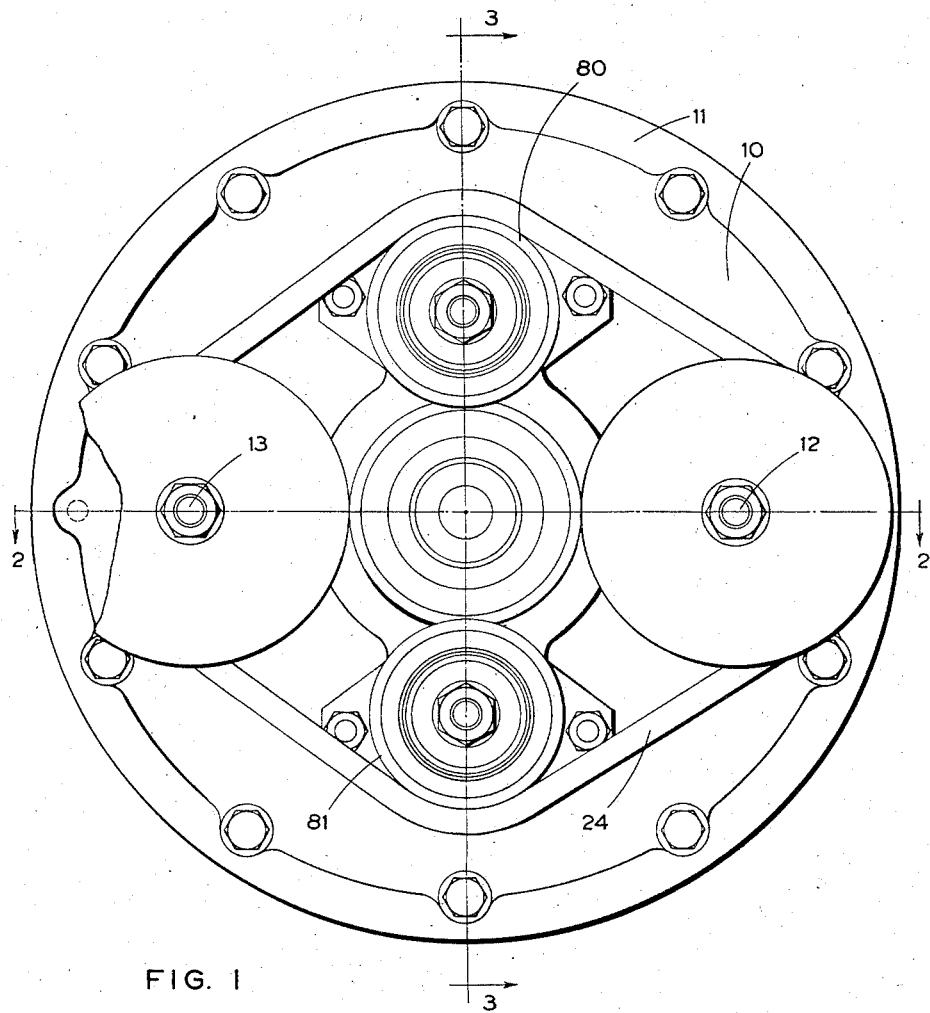
Figure 1 is an elevational view of a power transmission gear made in accordance with the invention.
Figure 2:
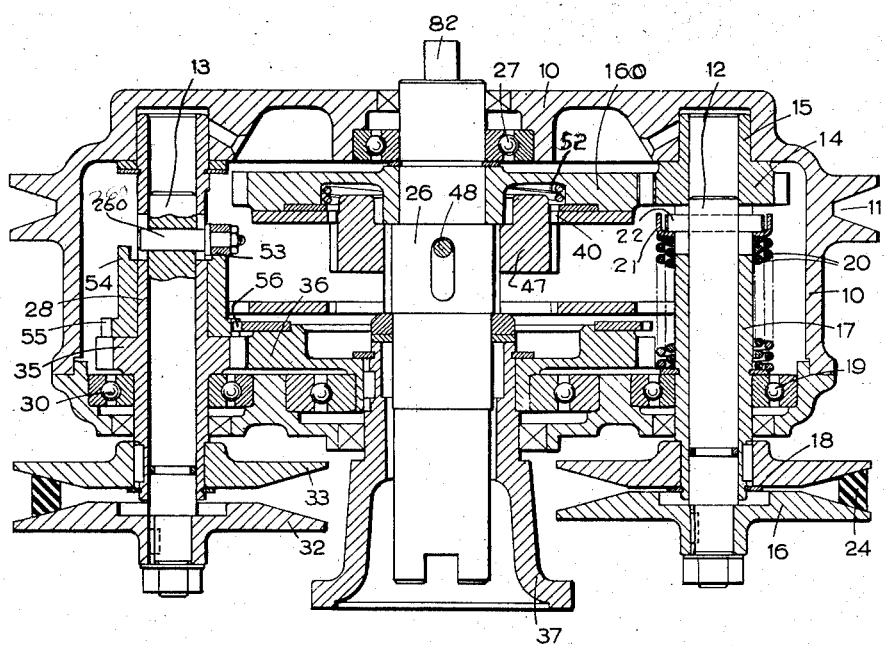
Figure 2 is a sectional view thereof on the line 2—2 on Figure 1.
Figure 4:
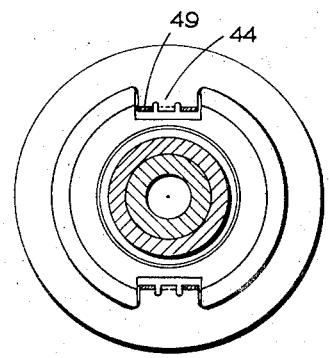
Figures 4 and 5 are sectional views on the line 4—5 on Figure 3 showing the parts in different positions.
Figure 5:
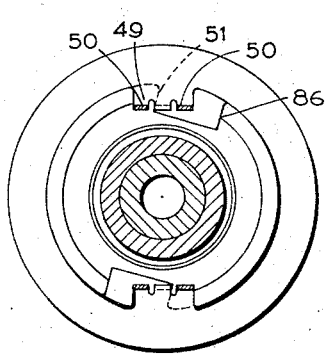
Figure 3:
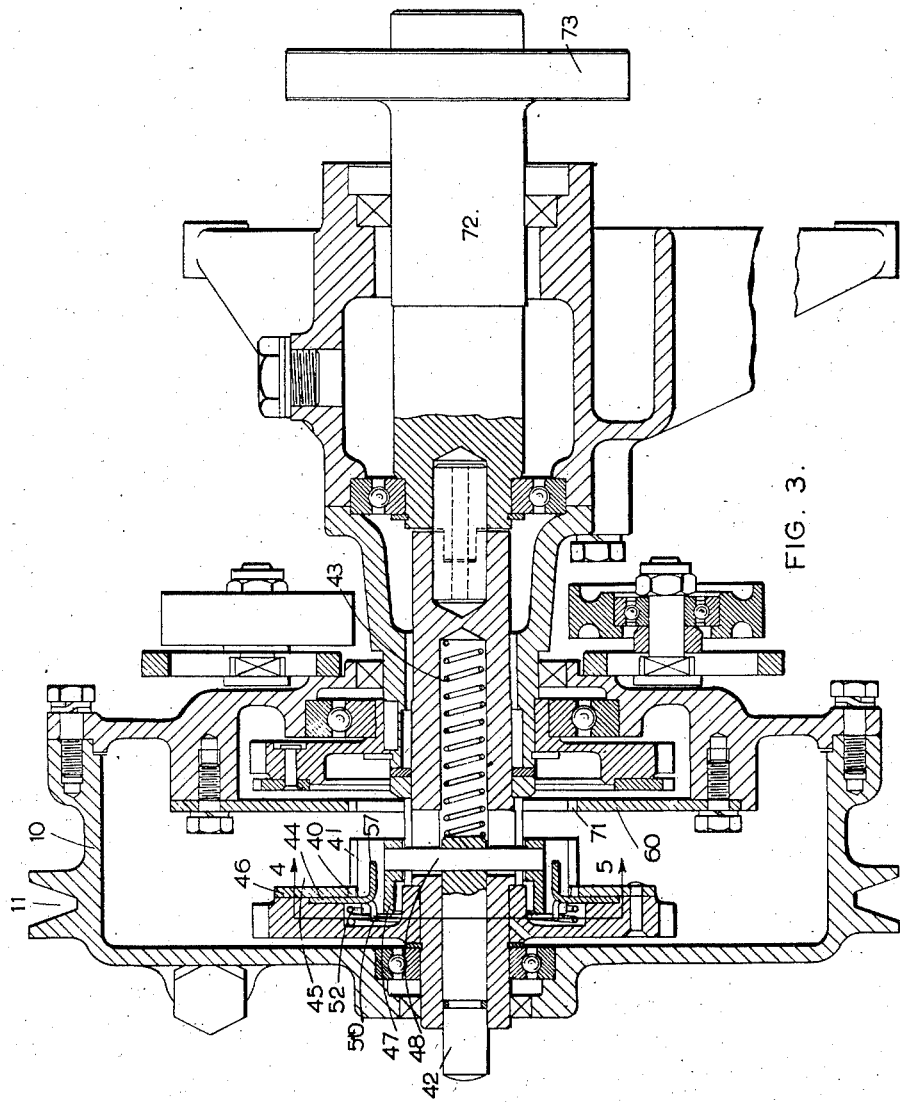
Figure 3 is a sectional view thereof on the line 3—3 on Figure 1.

The input member comprises a drum 10 having a V-annulus serving as a pulley 11. The drum carries two spindles 12, 13 parallel with its own axis and at equal radii therefrom but offset therefrom and offset 180° from each other. The spindle 12 at one end carries a planet pinion 14 which has a sleeve 15 that runs in a plain bearing in the drum 10. The other end of the spindle 12 carries a half-pulley disc 16. Surrounding the spindle 12 is a sleeve 17 that carries a half-pulley disc 18 and is rotatable in a bearing 19 carried by the drum 10. Springs 20 act in compression against a cap 21 seated on a pin 22 carried by the spindle 12 so that the latter pulls the disc 16 resiliently towards the disc 18 whereby a belt 24 can engage the pulley at different diameters thereof. The pinion 14 is fixed to the sleeve 17 and the pin 22 holds the pinion and sleeve against rotation on the spindle 12.

The pinion 14 meshes with a driven sunwheel 16θ that is fixedly mounted on an output shaft 26 which is rotatably mounted in bearings 27 in the drum 10 coaxially therewith.

The spindle 13 is disposed rotatably in a sleeve 28 which is rotatably mounted in a bearing 30 in the drum 10. The spindle 13 carries a half-pulley disc 32 and the sleeve 28 carries the corresponding half-pulley disc 33, the pulley being engaged by the belt 24. The sleeve 28 has a planet pinion 35 cut thereon and this pinion meshes with a sunwheel 36 which surrounds the output shaft and is fixed on a stationary reaction part 37. The belt is also engaged by idle pulleys 80, 81.

The sunwheels are of similar diameter, and number of teeth. The driven sunwheel 16 carries a plate 46 having dog teeth 40 with which sliding dogs 41 on a sliding clutch collar 47 can engage, the latter being splined to the output shaft and controlled by a spindle 42 coaxial with the drum 10 and output shaft 26, which spindle is spring loaded by a spring 43 in the direction to engage the dogs but can be moved by the user to disengage the dogs. The collar 47 is fixed to the spindle by a pin 48. The spindle 42 is slidable axially relatively to the output shaft 26 but fixed against rotation relatively thereto so that the dogs serve as a clutch between the driven sunwheel and the output shaft. The sliding part of this clutch also carries a baulk ring 44 cooperating with a baulking annulus 45 on the sunwheel whereby the clutch can only engage at the moment of reversal of direction of rotation.

The sliding collar 47 carries a slotted projection 86 to coact with the baulk ring so that when the dogs are disengaged, the slots move relatively to the baulk ring thereby preventing engagement of the dogs until such time as inwardly projecting projections 49 on the baulk ring align with the slots.

The baulk ring 44 has tongues 50 extending in one direction and a tongue 57 extending in the other direction whereby the tongue 57 limits the relative movement of the slots 46. A spring 52 provides a friction loading on the baulk ring.

The spindle 13 carries an anti-friction roll 53 on a pin 260. The roll bears against a cam ring 54 that surrounds the sleeve 28. This cam ring carries a pinion 55 in mesh with a gearwheel 56 carried by the reaction sunwheel 36 but of slightly less size than the reaction sunwheel so that the cam ring rotates at a speed less than that of the reaction pinion whereby the spindle is reciprocated cyclically e. g. once during each five or six revolutions of the output shaft.

As the reaction pulley discs 32, 33 move apart the V-belt 24 thereon moves to a smaller radius of the pulley but at the same time the discs 16, 18 of the other pulley move together to take up the slack in the belt so that the belt moves to a part of this pulley of larger diameter. Accordingly the belt provides a continuously varying drive ratio between the two pulleys. When the ratio is 1:1 the output shaft is at rest; when the ratio is greater than this the output shaft is driven in one direction; and when the ratio is less than this the output shaft is driven in the opposite direction. The alternation of the direction of drive of the output shaft is thus effected smoothly and cyclically whilst the input shaft is driven continuously in a constant direction.

A plate 60 attached to the drum 10, carries dogs 71 which can be meshed with the sliding dogs 41, whereby the drum can be connected rigidly to the output shaft 26, and the output shaft driven constantly at the same speed as the input shaft.

When the invention is applied to a washing machine, the output shaft 26 may carry an extension 72 and flange 73, to which the washing drum of the machine is attached. A lever connected to the door or opening of the washing machine, will be arranged to contact the pin 42 so that the drum will stop rotating when the pin is moved inwards. Allowing the pin to move outwards by closing the door, or by means of further controls, will cause the sliding doors to be engaged under the control of the baulk ring, that is to say, the dogs will only engage when there is substantially no relative speed. For spin drying, a further control may move the pin 42 further inwards and sufficiently far to engage the dogs 42 with the dogs 71. Driving the drum 11 will then drive the washing drum attached to the flange 63 at constant and higher speed. It will be understood that the difference in sizes between the sunwheel 56 and pinion 55 and sunwheel 36 and pinion 35 will determine the frequency of the reversing cycles. The variation in the relative sizes of the pulleys 32, 33 and 16, 18 will determine the speeds and the number of revolutions made in each direction. It will be understood that if the variation in size of the pulleys is in one sense only, then the mechanism will transmit variable speeds in the one direction, i. e. it will come to rest, speed up in one direction and come to rest again. Similarly, it can be arranged so that there may be a considerable number of revolutions in one direction and few revolutions in the other direction.

Instead of providing the baulk device, the pulleys may be caused to equalize when the dog clutch is disengaged so that they will always re-engage whilst in neutral drive. The baulk device or equalising means ensures smooth acceleration and avoids overloading the electric motor or other source of driving power.

Various modified forms of devices can be provided for effecting cyclic variation of the distribution of power between the two gearings. For example, instead of a single belt we may provide two belts each having a jockey roller, and means for swinging the jockey rollers continuously so that as one tightens one belt, the other loosens the other belt, thereby varying the size of the driving pulleys.

Figure 6:
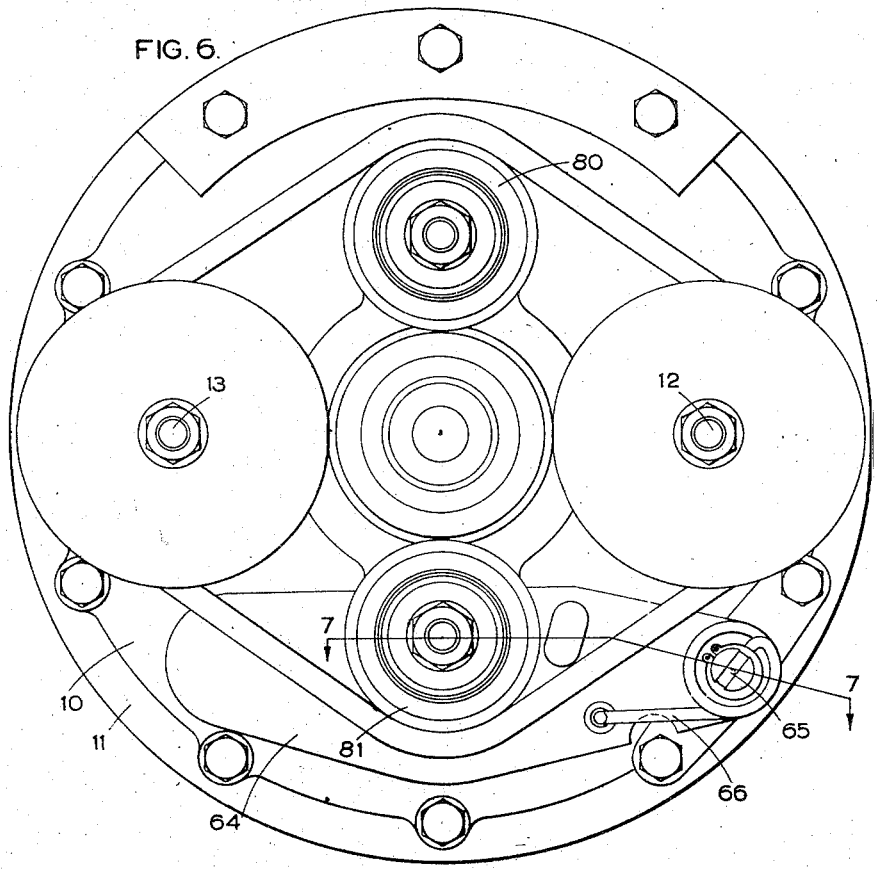
Figure 6 is a view similar to Figure 1 but showing a modified construction.
Figure 7:
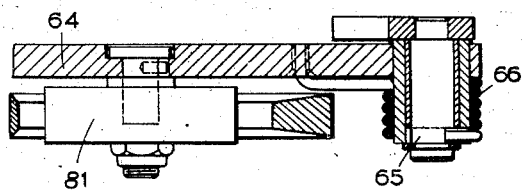
Figure 7 is a sectional view on the line 7—7 on Figure 6.

In an alternative construction shown in Figures 6 and 7, the sleeve 17 and spring 20 are omitted, and the pulley 16, 18 is replaced by a pulley of fixed and constant size. To take up the variation in the belt length with variation in the size of the pulley 32, 33, the jockey pulley 81 is carried by an arm 64, pivoted to the drum by a pin 65. A spring 66 is provided to maintain a moderate tension on the belt and the mass of the arm 64 urges the pulley 67 outwards under the action of centrifugal force, thereby maintaining the belt at fairly constant tension, despite the increase and decrease in the size of the pulley 32, 33.

I claim:

1. A power transmission gear comprising an input member, an output member, a reaction member, said input member being in the form of a drum coaxial with the output member and carrying at least two spindles offset from the output shaft and parallel thereto, a sunwheel fixed on the output member, planet pinions carried by at least one of said spindles and meshing with said sunwheel, a reaction sunwheel fixed on the reaction member, other planet pinions carried by at least one other of said spindles and meshing with said reaction sunwheel, two pulleys one on each of said spindles connectable by a driving belt, one of said pulleys comprising a pair of discs relatively movable towards and away from each other, adjusting means for cyclically adjusting the discs of at least one of the pulleys towards and away from each other, said adjusting means comprising a sleeve on one of said spindles which sleeve rotates with said spindle but is slidable axially of said spindle, one disc being carried by the spindle and the other by the sleeve, a cam device operating between said sleeve and spindle for effecting relative axial reciprocation of said sleeve and spindle, a toothed pinion carried by the sleeve, and a fixed gear wheel in mesh with said pinion said fixed gear wheel and pinion causing the sleeve to rotate relatively to the spindle, and means for driving the cam device to effect said reciprocation whereby the pulley discs are continuously and cyclically moved towards and away from each other.

2. A gear as claimed in claim 1 wherein the other pulley also comprises a pair of discs and spring means whereby the discs are spring loaded towards each other.

3. A gear as claimed in claim 1 wherein the other pulley is adapted to carry the belt on a fixed diameter, and for holding the belt taut a jockey wheel is provided carried by means which permits the jockey wheel to move outwards by centrifugal force.

4. A gear as claimed in claim 1 wherein the input member is connectible with the output sunwheel through a dog clutch device provided with baulking means whereby the clutch engages only at the moment of reversal of direction of drive of the output member.

5. A gear as claimed in claim 1 wherein the input member is directly connectible with the ouput sunwheel by a clutch.

6. A gear as claimed in claim 4 wherein the input member is directly connectible with the output sunwheel by a second clutch device and wherein the two clutch devices are controlled by a common control member whereby one clutch device or the other can be engaged.

References Cited in the file of this patent

UNITED STATES PATENTS

| 2,338,514 | Herzog | Jan. 4, 1944 |

FOREIGN PATENTS

| 1,027,577 | France | Feb. 18, 1953 |
| 568,719 | Germany | Jan. 23, 1933 |